US009221329B2

(12) United States Patent
Kuroda et al.

(10) Patent No.: US 9,221,329 B2
(45) Date of Patent: Dec. 29, 2015

(54) HYBRID VEHICLE

(75) Inventors: Shigetaka Kuroda, Saitama (JP); Shinji Fujimoto, Saitama (JP); Takefumi Ikegami, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 259 days.

(21) Appl. No.: 13/577,812

(22) PCT Filed: Mar. 4, 2011

(86) PCT No.: PCT/JP2011/055104
§ 371 (c)(1),
(2), (4) Date: Aug. 8, 2012

(87) PCT Pub. No.: WO2011/122243
PCT Pub. Date: Oct. 6, 2011

(65) Prior Publication Data
US 2012/0310462 A1 Dec. 6, 2012

(30) Foreign Application Priority Data

Mar. 31, 2010 (JP) ................................ 2010-081299
Mar. 31, 2010 (JP) ................................ 2010-081300

(51) Int. Cl.
*G06F 7/00* (2006.01)
*B60W 20/00* (2006.01)
(Continued)

(52) U.S. Cl.
CPC . *B60K 6/48* (2013.01); *B60L 11/14* (2013.01); *B60L 11/1861* (2013.01);
(Continued)

(58) Field of Classification Search
CPC ....... B60K 6/48; B60L 11/14; B60L 11/1861; B60L 2210/40; B60W 10/06; B60W 10/08; B60W 10/26; B60W 20/00; F16H 2003/0931; F16H 2200/0047; F16H 2200/0052; F16H 3/006; Y02T 10/6221; Y02T 10/6286; Y02T 10/70; Y02T 10/7005; Y02T 10/7044; Y02T 10/705; Y02T 10/7077; Y02T 10/7241
USPC .......... 701/22; 903/930; 180/65.265; 477/73, 477/77, 83
See application file for complete search history.

(56) References Cited

U.S. PATENT DOCUMENTS 6,019,183 A 2/2000 Shimasaki et al.
6,166,517 A * 12/2000 Wakashiro et al. ........... 320/104
(Continued)

FOREIGN PATENT DOCUMENTS

JP 11-148390 A 6/1996
JP 2002-089594 A 3/2002
(Continued)

OTHER PUBLICATIONS

Japanese Office Action dated Aug. 5, 2014, issued in Japanese Patent Application No. 2012-508170 (3 pages).
(Continued)

*Primary Examiner* — Fadey Jabr
*Assistant Examiner* — Angelina Shudy
(74) *Attorney, Agent, or Firm* — Westerman, Hattori, Daniels & Adrian, LLP

(57) ABSTRACT

When an idling stop request is generated, in the case of a B zone (the discharge limited zone) or a C zone (the discharge prohibited zone), then an internal combustion engine ENG is made to continue driving, and charging of an electric storage device BATT is performed. Thereafter, when an idling stop release request is generated, in the case of the B zone, a vehicle is started by driving an electric motor MG, while continuing driving of the internal combustion engine ENG and setting a first clutch C1 to an interrupted state. On the other hand, in the case of the C zone, the vehicle is started by continuing driving the internal combustion engine ENG, and setting the first clutch C1 to the connected state.

3 Claims, 10 Drawing Sheets

(51) Int. Cl.
*F16D 48/06* (2006.01)
*B60W 10/00* (2006.01)
*B60K 6/48* (2007.10)
*B60L 11/14* (2006.01)
*B60L 11/18* (2006.01)
*B60W 10/06* (2006.01)
*B60W 10/08* (2006.01)
*B60W 10/26* (2006.01)
*F16H 3/00* (2006.01)
*F16H 3/093* (2006.01)

(52) U.S. Cl.
CPC .............. *B60W 10/06* (2013.01); *B60W 10/08* (2013.01); *B60W 10/26* (2013.01); *B60W 20/00* (2013.01); *B60L 2210/40* (2013.01); *F16H 3/006* (2013.01); *F16H 2003/0931* (2013.01); *F16H 2200/0047* (2013.01); *F16H 2200/0052* (2013.01); *Y02T 10/6221* (2013.01); *Y02T 10/6286* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01)

(56) References Cited

U.S. PATENT DOCUMENTS

| 6,504,259 | B1* | 1/2003 | Kuroda et al. ............... 290/40 C |
| 7,721,833 | B2 | 5/2010 | Kikuchi |
| 2001/0018903 | A1* | 9/2001 | Hirose et al. ............... 123/179.4 |
| 2002/0021007 | A1* | 2/2002 | Morimoto .............. B60K 6/485 290/40 C |
| 2002/0033059 | A1 | 3/2002 | Pels et al. |
| 2004/0232861 | A1* | 11/2004 | Wakashiro et al. ........... 318/139 |
| 2005/0101432 | A1 | 5/2005 | Pels et al. |
| 2005/0279242 | A1* | 12/2005 | Maier et al. ................. 105/26.05 |
| 2006/0243501 | A1* | 11/2006 | Hidaka .................... B60K 6/48 180/65.1 |
| 2008/0275601 | A1 | 11/2008 | Saito et al. |
| 2009/0228192 | A1* | 9/2009 | Noyama et al. ................ 701/111 |
| 2010/0292047 | A1* | 11/2010 | Saito ...................... B60K 6/365 477/5 |
| 2011/0320079 | A1* | 12/2011 | Yasuda ........................... 701/22 |
| 2012/0303201 | A1* | 11/2012 | Tsuneishi .............. B60K 6/547 701/22 |
| 2012/0310462 | A1* | 12/2012 | Kuroda et al. .................. 701/22 |
| 2013/0045833 | A1* | 2/2013 | Okubo ................... B60K 6/387 477/5 |
| 2013/0096761 | A1* | 4/2013 | Kuroda .................... B60K 6/48 701/22 |
| 2013/0103242 | A1* | 4/2013 | Takeuchi et al. ................ 701/22 |
| 2013/0325237 | A1* | 12/2013 | Ikegami ............. B60L 11/1861 701/22 |

FOREIGN PATENT DOCUMENTS

| JP | 2005-002866 A | 1/2005 |
| JP | 2005-147312 A | 6/2005 |
| JP | 2007-291935 A | 11/2007 |
| JP | 2008-296897 A | 12/2008 |
| JP | 2009-107502 A | 5/2009 |
| JP | 2009-137531 A | 6/2009 |
| JP | 2009-166567 A | 7/2009 |
| JP | 2009166567 A * | 7/2009 |
| RU | 2 334 624 C2 | 9/2008 |

OTHER PUBLICATIONS

Russian Decision to Grant a Patent dated May 12, 2014, issued in counterpart Russian Patent Application No. 2012143975, w/English translation (20 pages).
International Search Report for PCT/JP2011/055104, mailing date of Jun. 7, 2011.

* cited by examiner

FIG.3

| | IMA START-UP | IDLING STOP | IDLING CHARGE | TRAVEL CHARGE | DECELERATIVE REGENERATION | ENGINE RELEASE | EV TRAVEL | ASSIST | MOTOR ROTATIONAL SPEED MATCHING |
|---|---|---|---|---|---|---|---|---|---|
| D-zone | ○ | ○ | × | × | △ | △ | ○ | ○ | △ |
| A-zone H | ○ | ○ | × | × | ○ | ○ | ○ | ○ | ○ |
| A-zone M | ○ | ○ | △ | △ | ○ | ○ | ○ | ○ | ○ |
| A-zone L | ○ | △ | △ | △ | ○ | △ | △ | △ | ○ |
| B-zone | ○ | × | ○ | ○ | ○ | × | × | △ | ○ |
| C-zone | △ | × | ○ | ○ | △ | × | × | × | △ |

○ : PERMIT    △ : LIMIT    × : PROHIBIT

FIG.9
(a)
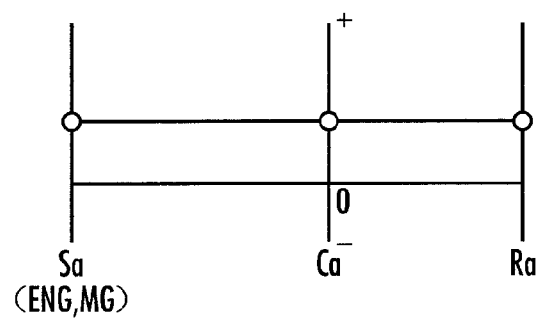
(b)
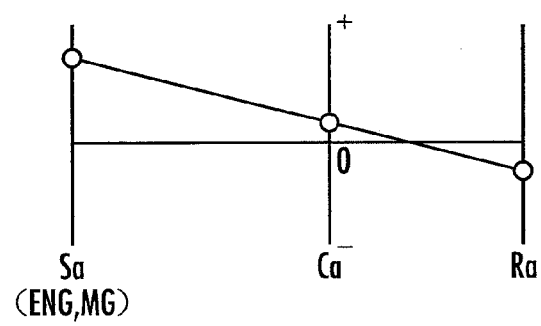
(c)
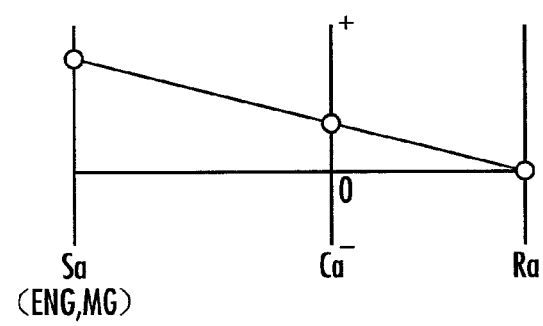

HYBRID VEHICLE

TECHNICAL FIELD

The present invention relates to a hybrid vehicle equipped with an internal combustion engine, an electric motor, an electric storage device, and an automatic transmission.

BACKGROUND ART

Conventionally, there is known a hybrid vehicle equipped with an automatic transmission having a first input shaft which is selectively coupled to an output shaft via a plurality of gear trains establishing gear shift stages, and which is connected to an electric motor, a second input shaft which is selectively coupled to the output shaft via a plurality of gear trains establishing variable speed stages, a first clutch capable of switching between a transmission state of transmitting a driving force of an internal combustion engine to the first input shaft and an opened state which cuts off the transmission, and a second clutch capable of switching between the transmission state of transmitting the driving force of the internal combustion engine to the second input shaft and the opened state which cuts off the transmission (for example, refer to Patent Document 1 and 2). In the automatic transmission, it is possible to start up the internal combustion engine by the driving force of the electric motor.

Recently, for improvement of fuel consumption and environmental performance, it is proposed to perform an idling stop control of automatically stopping the internal combustion engine during vehicle stop.

In Patent Document 2, there is disclosed that the starting up of the internal combustion engine is permitted, during an EV travel only with the driving force of the electric motor (motor), in the case where a vehicle speed is equal to or more than a determination vehicle speed. Further, in Patent Document 2, there is disclosed that during vehicle stop, it is switched from EV start to a start by the driving force of the internal combustion engine, in the case where an estimated electric storage state of an electric storage device (battery) drops below a preliminary set determination value, or in the case where an estimated road surface inclination exceeds a preliminary set determination inclination.

PRIOR ART REFERENCE

Patent Document

Patent Document 1: Japanese Patent Laid-Open No. 2002-89594
Patent Document 2: Japanese Patent Laid-Open No. 2009-166567

DISCLOSURE OF THE INVENTION

Problems to be Solved by the Invention

In the hybrid vehicle equipped with the automatic transmission according to the Patent Documents 1 and 2, in the case where the idling stop control is performed, there is a fear that the electric motor cannot be driven, and it becomes impossible to start the vehicle, when a remaining capacity of the electric storage device which supplies electric power to the electric motor is small.

Further, in the hybrid vehicle equipped with the automatic transmission according to the Patent Documents 1 and 2, when the remaining capacity of the electric storage device which supplies electric power to the electric motor becomes small during EV travel, there is a fear that it becomes impossible to obtain the driving power required for the travel of the vehicle because the internal combustion engine cannot be started.

The present invention aims at providing a hybrid vehicle capable of starting the vehicle reliably, in the idling stop control, even when the remaining capacity of the electric storage device which supplies electric power to the electric motor is small.

Further, the present invention aims at providing a hybrid vehicle capable of reliably preventing the situation where the driving force of the internal combustion engine cannot be obtained during EV travel.

Means for Solving the Problems

The present invention is a hybrid vehicle, comprising: an internal combustion engine; an electric motor; an electric storage device providing and receiving electric power to and from the electric motor; an automatic transmission including a first input shaft which is transmitted with a driving force of the internal combustion engine selectively via a first make-and-break element, and which is connected to the electric motor, a second input shaft which is transmitted with the driving force of the internal combustion engine selectively via a second make-and-break element, and a coupling element which couples the first input shaft or the second input shaft selectively to an output shaft, wherein a motive power output from the internal combustion engine and the electric motor is shifted and transmitted to the output shaft; a zone distinguishing element which detects a remaining capacity of the electric storage device, and distinguishes, on the basis of the detected remaining capacity, a standard zone, a discharge limited zone in which the remaining capacity is smaller than the standard zone, and a discharge prohibited zone in which the remaining capacity is smaller than the discharge limited zone; and an idling stop control element, which controls so as to perform charging of the electric storage device, when an idling stop request is generated, in the case where the zone distinguished by the zone distinguishing element is the discharge limited zone or the discharge prohibited zone, by setting the first make-and-break element to the connected state while maintaining driving of the internal combustion engine so as to rotate the first input shaft, and thereafter, when an idling stop release request is generated, in the case where the zone distinguished by the zone distinguishing element is the standard zone, then controls to start the vehicle while setting the internal combustion engine to a stopped state and the electric motor to a driving state, in the case where the zone distinguished by the zone distinguishing element is the discharge limited zone, then controls to start the vehicle by driving the electric motor while continuing driving of the internal combustion engine and maintaining the first make-and-break element to an interrupted state, and in the case where the zone distinguished by the zone distinguishing element is the discharge prohibited zone, then controls to start the vehicle by continuing driving of the internal combustion engine and setting the first make-and-break element to a connected state.

According to the hybrid vehicle of the present invention, the idling stop control element performs the appropriate idling stop control, according to the zone distinguished by the zone distinguishing element, on the basis of the detected remaining capacity of the electric storage device, so that it becomes possible to start the vehicle reliably.

That is, in the case where it is the discharge limited zone or the discharge prohibited zone where the remaining capacity of the electric storage device is small, the idling stop control element makes the internal combustion engine continue driving, even when the idling stop request is generated. Thereafter, when the idling stop release request is generated, in the case where it is the discharge prohibited zone, the vehicle is made to start by continuing driving of the internal combustion engine and setting the first make-and-break element to the connected state. Therefore, even in the discharge zone incapable of driving the electric motor with the electric power from the electric storage device, it becomes possible to make the vehicle travel by the driving force of the internal combustion engine, by setting the first make-and-break element to the connected state.

Further, in the case where it is the discharge limited zone when the idling stop release request is generated, the idling stop control element continues driving of the internal combustion engine, and makes the vehicle start by driving the electric motor while maintaining the first make-and-break device to the interrupted state. Therefore, even when the remaining capacity of the electric storage device decreased and became the discharge limited zone after starting of the vehicle, it becomes possible to make the vehicle travel immediately by the driving force of the internal combustion engine, by setting the first make-and-break element to the connected state.

Further, in the case where it is the standard zone when the idling stop release request is generated, the idling stop control element starts the vehicle, by setting the internal combustion engine to the stopped state, and the electric motor to the driving state. By doing so, it becomes possible to start the vehicle without accompanying fuel consumption by the internal combustion engine.

Further, in the case where it is the discharge limited zone or the discharge prohibited zone in which the remaining capacity of the electric storage device is small when the idling stop request is generated, the idling stop control element controls so as to perform charging of the electric storage device, by setting the first make-and-break element to the connected state while continuing driving of the internal combustion engine, and make the first input shaft to rotate. Therefore, it becomes possible to increase the remaining capacity of the electric storage device during vehicle stop.

Further, in the hybrid vehicle of the present invention, it is preferable that the coupling element includes a first selecting element which selectively couples the first input shaft and the output shaft, a second selecting element which selectively couples the second input shaft and the output shaft, and a differential rotating mechanism which is configured from a first rotating element which is connected to the first input shaft, a second rotating element which is coupled to the output shaft, and a third rotating element provided with a lock element, so as to be able to mutually rotate differentially, and the idling stop control element controls so as to perform charging of the electric storage device, when the idling stop request is generated, in the case where the zone distinguished by the zone distinguishing element is the discharge limited zone or the discharge prohibited zone, by setting the first make-and-break element to the connected state while maintaining driving of the internal combustion engine, and rotating the first input shaft by setting the third rotating element to a lock released state by the lock element, and thereafter, when the idling stop release request is generated, control so as to start the vehicle after setting the third rotating element to a locked state by the lock element.

In this case, it becomes possible to perform transition from the charging state of the electric storage device during vehicle stop to the vehicle start, by the existence or nonexistence of the lock state of the third rotating element by the lock element, so that the structure of the automatic transmission and the control thereof becomes simple.

Further, in the hybrid vehicle of the present invention, it is preferable that the vehicle further comprises an inclination detecting element which detects an inclination of a road surface to which the vehicle contacts, wherein the coupling element includes a first selecting element which selectively couples the first input shaft and the output shaft, a second selecting element which selectively couples the second input shaft and the output shaft, and a differential rotating mechanism which is configured from a first rotating element which is connected to the first input shaft, a second rotating element which is coupled to the output shaft, and a third rotating element provided with a lock element, so as to be able to mutually rotate differentially, and the idling stop control element controls so as to perform charging of the electric storage device, when the idling stop request is generated, in the case where the inclination detected by the inclination detecting element exceeds a threshold value, by setting the first make-and-break element to the connected state while continuing driving of the internal combustion engine, and by rotating the first input shaft, and thereafter, when the idling stop release request is generated, controls to make the vehicle start by driving the electric motor, while continuing driving of the internal combustion engine, and while maintaining the first make-and-break element to the interrupted state.

In the case where the vehicle is stopping while contacting the steep inclined road surface exceeding the threshold value when the idling stop request is generated, the idling stop control element makes the internal combustion engine continue driving, regardless of the zone distinguished by the zone distinguishing element. Thereafter, when the idling stop release request is generated, the vehicle is started by driving the electric motor, while continuing driving of the internal combustion engine while maintaining the first make-and-break element to the interrupted state, regardless of the zone distinguished by the zone distinguishing element. In the case where the driving force necessary for climbing the steep inclined road surface after vehicle start cannot be supplied only by the electric motor, it becomes possible to supply the necessary driving force for making the vehicle travel immediately by adding the driving force of the internal combustion engine, by setting the first make-and-break element to the connected state.

The hybrid vehicle of the present invention is a hybrid vehicle, comprising: an internal combustion engine; an electric motor; an electric storage device providing and receiving electric power to and from the electric motor; an automatic transmission including a first input shaft which is transmitted with a driving force of the internal combustion engine selectively via a first make-and-break element, and which is connected to the electric motor, a second input shaft which is transmitted with the driving force of the internal combustion engine selectively via a second make-and-break element, an output shaft coupled to the first input shaft or the second input shaft, a first selecting element which couples the first input shaft and the output shaft by a gear train selected from a plurality of gear trains, and a second selecting element which couples the second input shaft and the output shaft by a gear train selected from a plurality of gear trains, wherein a motive power output from the internal combustion engine and the electric motor is shifted and transmitted to the output shaft; a remaining capacity detecting element which detects the remaining capacity of the electric storage device; a vehicle speed detecting element which detects a traveling speed of the vehicle; and a control element which, when the first selecting element is in a coupled state where the first input shaft and the output shaft are coupled by the selected gear train, and when vehicle is made to travel only from a driving force of the electric motor, in the case where a vehicle speed detected by the vehicle speed detecting element becomes equal to or lower than a threshold value, and the remaining capacity detected by the remaining capacity detecting element becomes equal to or smaller than a threshold value, controls the internal combustion engine to start up, by first gradually decreasing the driving force of the electric motor until the coupled state of the first selecting element is releasable, then releasing the coupled state of the first selecting element, and setting the first make-and-break element to the connected state.

When the remaining capacity of the electric storage device becomes equal to or smaller than the predetermined value, it becomes impossible to start up the internal combustion engine by driving the electric motor with the electric power from the electric storage device. Also, when the vehicle speed becomes equal to or smaller than the predetermined value, it becomes impossible to start up the internal combustion engine by using the kinetic energy of the vehicle.

According to the hybrid vehicle of the present invention, when the first selecting element is in the coupled state where the first input shaft and the output shaft are coupled by the gear train, and the vehicle is made to travel only with the driving force of the electric motor, in the case where the vehicle speed becomes equal to or smaller than the threshold value and the remaining capacity of the electric storage device becomes equal to or smaller than the threshold value, the internal combustion is started up by releasing the coupled state of the first selecting element and setting the first make-and-break element to the connected state, after gradually decreasing the driving force of the electric motor until the coupled state of the first selecting element becomes releasable.

Therefore, by setting the threshold value of the remaining capacity to a value exceeding the predetermined value in which the start up of the internal combustion engine becomes impossible, and by setting the threshold value of the vehicle speed to a value equal to or more than the predetermined value in which the start up of the internal combustion engine becomes impossible, it becomes possible to reliably start up the internal combustion engine, before becoming impossible to start up the internal combustion engine by driving the electric motor with the electric power from the electric storage device.

The internal engine is started up by setting the first make-and-break element to the connected state after releasing the coupled state of the first selecting element, so that the driving force from the start up of the internal combustion engine is not transmitted to the output shaft. Further, because the electric motor can be used only for the start up of the internal combustion engine, it becomes possible to reliably start up the internal combustion engine.

In the hybrid vehicle of the present invention, it is preferable that the vehicle further comprises a brake which brakes the travel of the vehicle, wherein the control element controls the internal combustion engine to start up, when the vehicle stops during gradual decrease of the driving force of the electric motor, by setting the first make-and-break element to the connected state when the driving force of the electric motor becomes approximately 0, while maintaining the stopped state of the vehicle by the brake.

In this case, even when the vehicle is traveling the upslope road, when the vehicle stops, the internal combustion engine is started up while maintaining the stopped state of the vehicle by the brake. Therefore, it becomes possible to start up the internal combustion engine without the vehicle slipping down the road surface. Further, there is no need to estimate the road inclination such as in the Patent Document 2.

Further, in the hybrid vehicle of the present invention, it is preferable that the vehicle further comprises a brake which brakes the travel of the vehicle, wherein the control element controls the internal combustion engine to start up, when the vehicle stops before starting up the internal combustion engine, by operating the brake to make the driving force of the electric motor $0$, as well as setting the first make-and-break element to the connected state.

In this case, when the vehicle stops before starting up the internal combustion engine, the internal combustion is started up while maintaining the stopped state of the vehicle by the brake. Therefore, even when the road surface on which the vehicle stopped is inclined steeply, it becomes possible to start up the internal combustion engine without the vehicle slipping down the road surface. Further, there is no need to estimate the road inclination such as in the Patent Document 2.

The predetermined value of the remaining capacity of the electric storage device in which the start up of the internal combustion engine becomes impossible by driving the electric motor with the electric power from the electric storage device differs according to the inclination of the road surface to which the vehicle contacts.

In the hybrid vehicle of the present invention, it is preferable that the vehicle further comprises an inclination detecting element which detects an inclination of a road surface to which the vehicle contacts, wherein the threshold value of the remaining capacity is set according to the inclination detected by the inclination detecting element.

Further, when gradually decreasing the driving force of the electric motor, the shock becomes larger as the vehicle speed becomes faster.

Therefore, in the hybrid vehicle of the present invention, it is preferable that the control element reduces the decreasing speed of the driving force, during gradual decrease of the driving force of the electric motor, as the vehicle speed detected by the vehicle speed detecting element becomes faster.

BRIEF DESCRIPTION OF THE DRAWINGS

FIG. 3 A table showing permission, limitation, prohibition of various operation according to the zone of the electric storage device.

FIG. 9 (*a*), (*b*), and (*c*) are collinear graphs showing change according to lapse of time of the start up control of the internal combustion engine by IMA start-up.

MODE FOR CARRYING OUT THE INVENTION

Figure 1:
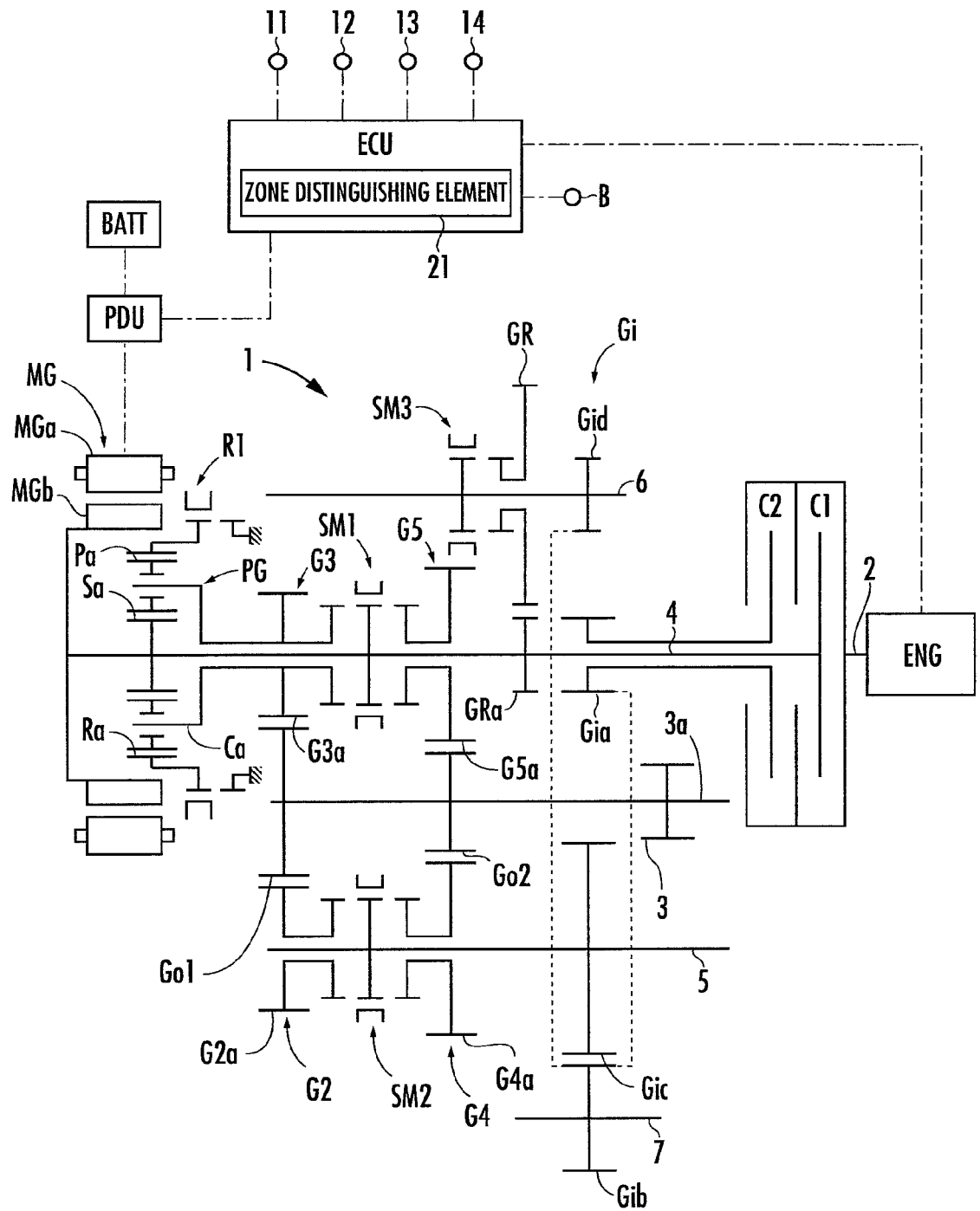
FIG. 1 An explanatory view showing a hybrid vehicle according to an embodiment of the present invention.

Referring to the drawings, an embodiment of the hybrid vehicle according to the present invention will be explained.

The hybrid vehicle illustrated in FIG. 1 is equipped with an internal combustion engine ENG, an electric motor MG, an electric storage device BATT comprising a secondary battery which sends and receives electricity to and from the electric motor MG, an automatic transmission 1, and a power control device ECU (Electric Control Unit) which controls each part of the automatic transmission 1, the internal combustion engine ENG, and the electric motor MG.

The automatic transmission 1 is equipped with an engine output shaft 2 to which a driving power (an output torque) of the internal combustion engine ENG is transmitted, an output member 3 constituted by an output gear which outputs the power to right and left front wheels serving as drive wheels through the intermediary of a differential gear, which is not shown, and a plurality of gear trains G2 to G5 having different transmission gear ratios.

Further, the automatic transmission 1 includes a first input shaft 4, which rotatably supports drive gears G3a and G5a of odd gear trains G3 and G5 which establish each gear shift stages of odd ordinals in a transmission gear ratio rank order, a second input shaft 5, which rotatably supports drive gears G2a and G4a of even gear trains G2 and G4 which establish gear shift stages of even ordinals in the transmission gear ratio rank order, and a reverse shaft 6, which rotatably supports a reverse gear GR. The first input shaft 4 is disposed on the same axial line with the engine output shaft 2, and the second input shaft 5 and the reverse shaft 6 are arranged in parallel to the first input shaft 4.

Further, the automatic transmission 1 is equipped with an idle gear train Gi constituted by an idle drive gear Gia rotatably supported by the first input shaft 4, a first idle driven gear Gib, which is fixed to an idle shaft 7 and which meshes with the idle drive gear Gia, a second idle driven gear Gic, which is fixed to the second input shaft 5, and a third idle driven gear Gid, which is fixed to the reverse gear 6 and which meshes with the first idle drive gear Gib. The idle shaft 7 is arranged in parallel to the first input shaft 4.

The automatic transmission 1 includes a first clutch C1 and a second clutch C2 that comprises a dry friction clutch or a wet friction clutch of a hydraulically-actuated type. The first clutch C1 is configured to be freely switchable between a transmission state in which the driving power of the internal combustion engine ENG transmitted to the engine output shaft 2 is transmitted to the first input shaft 4, and an opened state in which the transmission is cut off. The second clutch C2 is configured to be freely switchable between the transmission state in which the driving force of the internal combustion engine ENG transmitted to the engine output shaft 2 is transmitted to the second input shaft 5, and the opened state in which the transmission is cut off. When the transmission state is established by engaging the second clutch C2, the engine output shaft 2 is connected to the second input shaft 5 through the first idle driven gear Gib and the second idle driven gear Gic.

It is preferable that the both clutches C1 and C2 are actuated by an electrical actuator so that the state is changed promptly. The both clutches C1 and C2 may be actuated by a hydraulic-type actuator.

Further, in the automatic transmission 1, a planetary gear mechanism PG which is a differential rotary mechanism is disposed coaxially with the engine output shaft 2. The planetary gear mechanism PG is a single pinion type composed of a sun gear Sa, a ring gear Ra, and a carrier Ca, which rotatably supports a pinion Pa meshing with the sun gear Sa and the ring gear Ra such that these gears rotate on their axes and revolve in an orbital motion.

If three rotational elements composed of the sun gear Sa, the carrier Ca, and the ring gear Ra of the planetary gear mechanism PG are defined as a first rotational element, a second rotational element and a third rotational element from the sun gear Sa side in the order in which they are arranged at intervals corresponding to gear ratios in the velocity diagram (a diagram capable or representing a relative rotational speed of each rotational element with straight lines), then the first rotational element corresponds to the sun gear Sa, the second rotational element corresponds to the carrier Ca, and the third rotational element corresponds to the ring gear Ra.

When the gear ratio of the planetary gear mechanism PG (the number of teeth of the ring gear Ra/the number of teeth of the sun gear Sa) being denoted by g, a ratio of an interval between the sun gear Sa serving as the first rotational element and the carrier Ca serving as the second rotational element and an interval between the carrier Ca serving as the second rotational element and the ring gear Ra serving as the third rotational element becomes g:1.

The sun gear Sa serving as the first rotational element is secured to the first input shaft 4. The carrier Ca serving as the second rotational element is connected to the 3rd-speed drive gear G3a of the 3rd-speed gear train G3. The ring gear Ra serving as the third rotational element is disengageably fixed to an immovable portion such as a transmission case by a lock mechanism R1.

The lock mechanism R1 is configured from a synchromesh mechanism capable of switching freely between a fixed state in which the ring gear Ra is fixed to the immovable portion and the opened state in which the ring gear Ra is rotatable.

The lock mechanism R1 is not limited to the synchromesh mechanism, and may be configured from a friction engagement release mechanism such as a sleeve, brakes such as a wet type multi-disc brake, a hub brake, and a band brake and the like, a one-way clutch, or a two-way clutch and the like.

Also, the planetary gear mechanism PG may be configured from a double pinion type comprising a sun gear, a ring gear, and a carrier, which rotatably supports a pair of pinions Pa, Pa' engaging with each other and one of the pinion engaging with the sun gear Sa and the other of the pinion engaging with the ring gear Ra such that these gears rotate on their axes and revolve in an orbital motion. In this case, for example, it may be configured so that the sun gear (the first rotational element) is fixed to the first input shaft 4, the ring gear (the second rotational element) is connected to the 3rd-speed drive gear G3a of the 3rd-speed gear train G3, and the carrier (the third rotational element) is disengageably fixed to the immovable portion by the lock mechanism R1.

A hollow electric motor MG (motor/generator) is disposed on the outer side in the radial direction of the planetary gear mechanism PG. In other words, the planetary gear mechanism PG is disposed in the inner side of the hollow electric motor MG. The electric motor MG has a stator MGa and a rotor MGb.

Further, the electric motor MG is controlled through the intermediary of a power drive unit PDU on the basis of instruction signals of the power control device ECU. The power control device ECU switches the power drive unit PDU, as necessary, between a drive mode in which the electric power of the electric storage device BATT is consumed to drive the electric motor MG and a regenerative mode in which electric power is generated while restraining the rotational force of the rotor MGb and the generated electric power is charged into the electric storage device BATT through the intermediary of the power drive unit PDU.

A first driven gear Go1, which engages with a 2nd-speed drive gear G2a and a 3rd-speed drive gear G3a, is fixed to an output shaft 3a, which supports the output member 3. Further, a second driven gear Go2, which engages with a 4th-speed drive gear G4a and a 5th-speed drive gear G5a, is fixed to the output shaft 3a. Also, a parking gear GP is fixed to the output shaft 3a.

Thus, constructing the driven gear of the 2nd-speed gear train G2 and the 3rd-speed gear train G3 and the driven gears of the 4th-speed gear train G4 and the 5th-speed gear train G5 by the single gear Go1 and the single gear Go2, respectively, makes it possible to shorten the axial length of the automatic transmission and thereby improving its mountability in an FF (front-wheel-drive) type vehicle.

The first input shaft 4 has a first meshing mechanism SM1, which is a first selecting means, which is composed of a synchromesh mechanism and which is capable of switching to one of a 3rd-speed side coupled state in which the 3rd-speed drive gear G3a and the first input shaft 4 are coupled, a 5th-speed side coupled state in which the 5th-speed drive gear G5a and the first input shaft 4 are coupled, and a neutral state in which the coupling of the 3rd-speed drive gear G3a and the 5th-speed drive gear G5a to the first input shaft 4 are cut off.

The second input shaft 5 has a second meshing mechanism SM2, which is a second selecting means, which is composed of a synchromesh mechanism and which is capable of switching to one of a 2nd-speed side coupled state in which the 2nd-speed drive gear G2a and the second input shaft 5 are coupled, a 4th-speed side coupled state in which the 4th-speed drive gear G4a and the second input shaft 5 are coupled, and the neutral state in which the coupling of the 2nd-speed drive gear G2a and the 4th-speed drive gear G4a to the second input shaft 5 are cut off.

Further, a reverse driven gear GRa which engages with the reverse gear GR is fixed to the first input shaft 4.

The reverse shaft 6 has a third meshing mechanism SM3, which is composed of a synchromesh mechanism and which is capable of switching to one of a coupled state in which the reverse gear GR and the reverse shaft 6 are coupled, and the neutral state in which the coupling of the two are cut off.

Next, the operation of the automatic transmission 1 configured as is mentioned above will be explained.

The automatic transmission 1 is capable of performing an IMA start-up of starting up the internal combustion engine ENG using the driving force of the electric motor MG, by engaging the first clutch C1.

In the case of establishing a 1st speed stage by using the driving force of the internal combustion engine ENG, the ring gear Ra of the planetary gear mechanism PG is set to the fixed state by the lock mechanism R1, and the first clutch C1 is engaged to the transmission state.

The driving force of the internal combustion engine ENG is input to the sun gear Sa of the planetary gear mechanism PG through the intermediary of the engine output shaft 2, the first clutch C1, and the first input shaft 4. The rotational speed of the internal combustion engine ENG input to the engine output shaft 2 is reduced to $1/(g+1)$, and the reduced rotational speed is transmitted to the 3rd-speed drive gear G3a via the carrier Ca.

Denoting the gear ratio of the 3rd-speed gear train G3 composed of the 3rd-speed drive gear G3a and the first driven gear Go1 (the number of teeth of the 3rd-speed drive gear G3a/the number of teeth of the first driven gear Go1) by i, the driving force transmitted to the 3rd-speed drive gear G3a is shifted to $1/i(g+1)$ and then output from an output member 3 through the intermediary of the first driven gear Go1 and the output shaft 3a, thus establishing the 1st speed stage. By doing so, it becomes possible to perform an ENG travel of traveling only with the driving force of the internal combustion engine ENG.

As is explained above, the automatic transmission 1 is capable of establishing the 1st speed stage with the planetary gear mechanism PG and the 3rd-speed gear train, a special meshing mechanism for the 1st speed stage is not necessary, so that it becomes possible to shorten the axial length of the automatic transmission.

In the 1st speed stage, when the vehicle is in a decelerating state according to a remaining capacity (a charging rate) SOC of the electric storage device BATT, the power control device ECU performs a decelerating regeneration operation of performing electric generation by braking with the electric motor MG. Further, according to the remaining capacity SOC of the electric storage device BATT, it becomes possible to drive the electric motor MG and perform HEV (Hybrid Electric Vehicle) travel which supplements the driving force of the internal combustion engine ENG, or an EV (Electric Vehicle) travel which travels only with the driving force of the electric motor MG.

Further, in the case where the deceleration of the vehicle is allowed during the EV travel, and the vehicle speed is at a predetermined speed or more, it becomes possible to start up the internal combustion engine ENG using a kinetic energy of the vehicle, by gradually engaging the first clutch C1, without using the driving force of the electric motor MG.

If the power control device ECU predicts while traveling at the 1st speed stage that the 1st speed stage will be shifted up to the 2nd speed stage on the basis of vehicle information, such as a vehicle speed and the opening degree of the accelerator pedal, then the power control device ECU sets the second meshing mechanism SM2 to the 2nd-speed side coupled state in which the 2nd-speed drive gear G2a and the second input shaft 5 are coupled or a pre-shift state approximating to the aforesaid state.

To establish the 2nd speed stage by using the driving force of the internal combustion engine ENG, the second meshing mechanism SM2 is set to the 2nd-speed side coupled state in which the 2nd-speed drive gear G2a is coupled to the second input shaft 5, and then the second clutch C2 is engaged to the transmission state. By doing so, the driving force of the internal combustion engine ENG is output from the output member 3, through the intermediary of the second clutch C2, the idle gear train Gi, the second input shaft 5, the 2nd-speed gear train G2, and the output shaft 3a.

If the power control device ECU predicts while traveling at the 2nd speed stage that the 2nd speed stage will be shifted up, then the power control device ECU sets the first meshing mechanism SM1 to the 3rd-speed side coupled state in which the 3rd-speed drive gear G3a and the first input shaft 4 are coupled or a pre-shift state approximating to the aforesaid state.

In contrast, if the power control device ECU predicts a shift down, the first meshing mechanism SM1 is set to the neutral state in which the coupling of the 3rd-speed drive gear G3a and the 5th-speed drive gear G5a to the first input shaft 4 are cut off.

By doing so, it becomes possible to perform shift-up or shift-down by setting the first clutch C1 to the transmission state and setting the second clutch C2 to the opened state, so that the switching of the speed stage may be performed smoothly without interrupting driving force.

Further, also in the 2nd speed stage, in the case where the vehicle is in the decelerating state, the power control device ECU performs the decelerating regeneration operation, according to the remaining capacity SOC of the electric storage device BATT. In the case of performing the decelerating regeneration operation in the 2nd speed stage, it differs whether the first meshing mechanism SM1 is the 3rd-speed side coupled state or the neutral state.

In the case where the first meshing mechanism SM1 is the 3rd-speed side coupled state, the third drive gear G3a, which is rotated by the first driven gear Go1 rotated by the second drive gear G2a, rotates the rotor MGb of the electric motor MG through the intermediary of the first input shaft 4. Therefore, regeneration is performed by suppressing rotation of the rotor MGb and braking so as to generate power.

In the case where the first meshing mechanism SM1 is the neutral state, regeneration is performed by setting the rotational speed of the ring gear Ra to 0 by setting the lock mechanism R1 to the fixed state, and by braking the rotational speed of the carrier Ca rotating together with the 3rd-speed drive gear G3a meshing with the first driven gear Go1 by making the electric motor MG connected to the sun gear Sa to generate power.

Further, in the case of performing HEV travel in 2nd speed stage, for example, it may be performed by setting the first meshing mechanism SM1 to the 3rd-speed side coupled state in which the 3rd-speed drive gear G3a and the first input shaft 4 are coupled, and each elements of the planetary gear mechanism PG are set to a state so that they cannot relatively rotate by setting the lock mechanism R1 to the opened state, and by transmitting the driving force of the electric motor MG to the output member 3 through the intermediary of the 3rd-speed gear train G3. Further, HEV travel in 2ne speed stage is possible by setting the rotational speed of the ring gear Ra to 0 by setting the first meshing mechanism SM1 to the neutral state and the lock mechanism R1 to the fixed state, and by transmitting the driving force of the electric motor MG to the first driven gear Go1 through the path of the 1st speed stage.

To establish the 3rd speed stage by using the driving force of the internal combustion engine ENG, the first meshing mechanism SM1 is set to the 3rd-speed side coupled state in which the 3rd-speed drive gear G3a and the first input shaft 4 are coupled, and the first clutch C1 is engaged to the transmission state. By doing so, the driving force of the internal combustion engine ENG is transmitted to the output member 3 through the intermediary of the engine output shaft 2, the first clutch C1, the first input shaft 4, the first meshing mechanism SM1, and the 3rd-speed gear train G3, and then output at a rotational speed of 1/i.

At the 3rd speed stage, the first meshing mechanism SM1 is in the 3rd-speed side coupled state where the 3rd-speed drive gear G3a and the first input shaft 4 are coupled, so that the sun gear Sa and the carrier Ca of the planetary gear mechanism PG share the same rotation.

Hence, each rotational element of the planetary gear mechanism PG is in the state wherein they cannot relatively rotate, so that the decelerative regeneration is implemented by using the electric motor MG to apply brakes to the sun gear Sa, and transmitting the driving force to the sun gear Sa by the electric motor MG allows the HEV travel to be accomplished. Further, it is possible to perform EV travel of traveling only with the driving force of the electric motor MG by releasing the first clutch C1.

In the 3rd speed stage, if the power control device ECU predicts a shift-down on the basis of vehicle information, such as the vehicle speed or the opening degree of the accelerator pedal, then the second meshing mechanism SM2 is set to the 2nd-speed side coupled state in which the 2nd-speed drive gear G2a and the second input shaft 5 are coupled or to the pre-shift state approximating to the aforesaid state. If a shift-up is predicted, then the second meshing mechanism SM2 is set to the 4th-speed side coupled state in which the 4th-speed drive gear G4a and the second input shaft 5 are coupled or the pre-shift state approximating to the aforesaid state.

By doing so, it becomes possible to perform switching of the speed stage by engaging the second clutch C2 to the transmission state and releasing the first clutch C1 to the opened state, so that speed change may be performed smoothly without interrupting the driving force.

To establish a 4th speed stage by using the driving force of the internal combustion engine ENG, the second meshing mechanism SM2 is set to the 4th-speed side coupled state in which the 4th-speed drive gear G4a and the second input shaft 5 are coupled, and engaging the second clutch C2 to the transmission state.

During a travel at the 4th speed stage, if the power control device ECU predicts a shift-down on the basis of vehicle information, then the first meshing mechanism SM1 is set to the 3rd-speed side coupled state in which the 3rd-speed drive gear G3a and the first input shaft 4 are coupled or to the pre-shift state approximating to the aforesaid state, In contrast, if the power control device ECU predicts a shift-up on the basis of vehicle information, then the first meshing mechanism SM1 is set to the 5th-speed side coupled state in which the 5th-speed drive gear G5a and the first input shaft 4 are coupled or to the pre-shift state approximating to the aforesaid state. By doing so, it becomes possible to accomplish the shift-down or the shift-up simply by engaging the first clutch C1 to the transmission state and releasing the second clutch C2 to the opened state, so that speed change may be performed smoothly without interrupting the driving force.

In the case of performing the decelerative regeneration or the HEV travel during traveling at 4th-speed stage, if the power control device ECU predicts a shift-down, then the first meshing mechanism SM1 is set to the 3rd-speed side coupled state in which the 3rd-speed drive gear G3a and the first input shaft 4 are coupled. The decelerative regeneration may be performed by applying brake by the electric motor MG, and HEV travel may be performed by transmitting the driving force.

If the power control device ECU predicts a shift-up, then the first meshing mechanism SM1 is set to the 5th-speed side coupled state in which the 5th-speed drive gear G5a and the first input shaft 4 are coupled. The decelerative regeneration may be performed by applying brake by the electric motor MG, and HEV travel may be performed by transmitting the driving force from the electric motor MG.

To establish the 5th speed stage by using the driving force of the internal combustion engine ENG the first meshing mechanism SM1 is set to the 5th-speed side coupled state in which the 5th-speed drive gear G5a and the first input shaft 4 are coupled. In the 5th speed stage, the internal combustion engine ENG and the electric motor MG are directly connected when the first clutch C1 is set to the transmission state, so that the HEV travel may be performed by outputting driving force from the electric motor MG, and the decelerative regeneration may be performed by applying brake by the electric motor MG and generate power.

In the case of performing EV travel at the 5th speed stage, the first clutch C1 is set to the opened state. Also, during EV travel at the 5th speed stage, the internal combustion engine ENG may be started by gradually engaging the first clutch C1.

During the travel at the 5th speed stage, if the power control device ECU predicts a shift-down to the 4th speed stage from vehicle information, then the second meshing mechanism SM2 is set to the 4th-speed side coupled state in which the 4th-speed drive gear G4a and the second input shaft 5 are coupled or a pre-shift state approximating to the aforesaid state. By doing so, shift-down to the 4th speed stage may be performed smoothly without interrupting the driving force.

To establish a reverse stage by using the driving force of the internal combustion engine ENG, the third meshing mechanism SM3 is set to the connected state in which the reverse gear GR and the reverse shaft 6 are connected, and then the second clutch C2 is engaged to the transmission state. This changes the rotational speed of the engine output shaft 2 to a negative rotation (rotation in the reverse direction), and the rotational speed is output from the output member 3, thereby establishing the reverse stage.

To carry out the decelerative regeneration or the HEV travel at the reverse stage, the first meshing mechanism SM1 is set to the 3rd-speed side coupled state in which the 3rd-speed drive gear G3a and the first input shaft 4 are coupled, and each rotational elements of the planetary gear mechanism PG is set to a state wherein they cannot relatively rotate by setting the lock mechanism R1 to the opened state. Then, causing the rotor MGb rotating in the reverse direction to generate a driving force on a forward rotation side and applying the brake implements decelerative regeneration, while causing the rotor MGb to generate a driving force on a reverse rotation side implements the HEV travel. Further, EV travel at the reverse stage may be established by setting both clutches C1 and C2 to the opened state and the lock mechanism R1 to the fixed state, and reversing the electric motor MG.

Further, the vehicle is provided with a brake mechanism B which brakes the travel of the vehicle. During stopping of the vehicle, when the brake mechanism B is operated and the vehicle is in the vehicle braked state, the rotation of the output shaft 3a is braked, and the vehicle continues to stop. The brake mechanism B is a disc brake or the like, and is controlled by the power control device ECU.

Further, the vehicle is provided with an inclination sensor 11 which detects an inclination D of the road surface to which the vehicle contacts, a brake pedal sensor 12 which detects the existence or non-existence of the stepping of the brake pedal, a vehicle speed sensor 13 which measures the traveling speed of the vehicle, and an accelerator pedal sensor 14 which detects the opening degree of the accelerator pedal. The detected signals from these sensors 11 through 14 are input to the power control device ECU.

The power control device ECU is equipped with a zone distinguishing element 21 which detects the remaining capacity SOC of the electric storage device BATT, and distinguishes the zone on the basis of the detected remaining capacity SOC. A predetermined value of the remaining capacity SOC of the electric storage device BATT which makes it impossible to start up the internal combustion engine ENG by driving the electric motor MG with the electric power from the electric storage device BATT differs according to the inclination D of the road surface to which the vehicle contacts.

Figure 2:
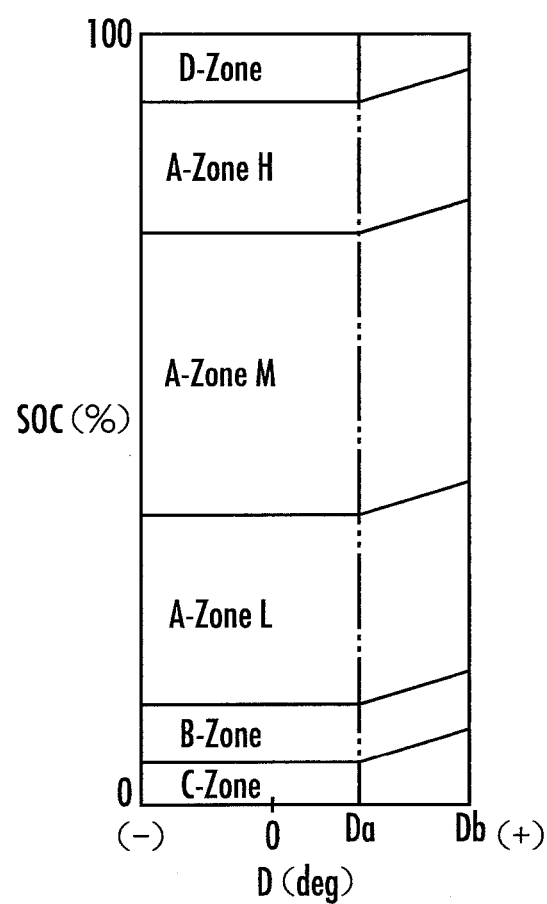
FIG. 2 An explanatory view showing zoning of an electric storage device.

Therefore, as is shown in FIG. 2, the zone distinguishing element 21 performs zoning of the remaining capacity SOC while taking account of the inclination D detected by the inclination sensor 11. Threshold value of each region is set so that the threshold value is constant until the inclination D reaches a predetermined inclination Da larger than 0 degree, and so that the threshold value becomes larger as the inclination D becomes larger when the inclination D is larger than the inclination Da. The threshold value of each zone may be set while taking account of other elements such as the temperature of the electric storage device BATT.

Specifically, the zone is classified into an A zone, which is a zone normally used and which becomes a standard zone, a B zone, which has smaller remaining capacity SOC than A zone and which is a discharge limited zone in which the discharge is partially limited, a C zone which has smaller remaining capacity SOC than B zone and is a discharge prohibited zone in which the discharge is limited, and a D zone in which has larger remaining capacity SOC than A zone and is a charge limited zone in which charging is limited. The A zone is further classified into an intermediate zone A zone M in which the remaining capacity SOC is optimum, an A zone L which has smaller remaining capacity SOC than the A zone M, and an A zone H which has larger remaining capacity SOC than the A zone M.

The zone distinguishing element 21 corresponds to the remaining capacity detecting element of the present invention, and the threshold value between a A zone L and the B zone corresponds to the threshold value of the remaining capacity of the present invention.

The power control device ECU controls the internal combustion engine ENG, the electric motor MG, and the automatic transmission 1 on the basis of the zone distinguished by the zone distinguishing element 21. As is shown in FIG. 3, the power control device ECU permits, limits, or prohibits various operations on the basis of the zone.

Figure 4:
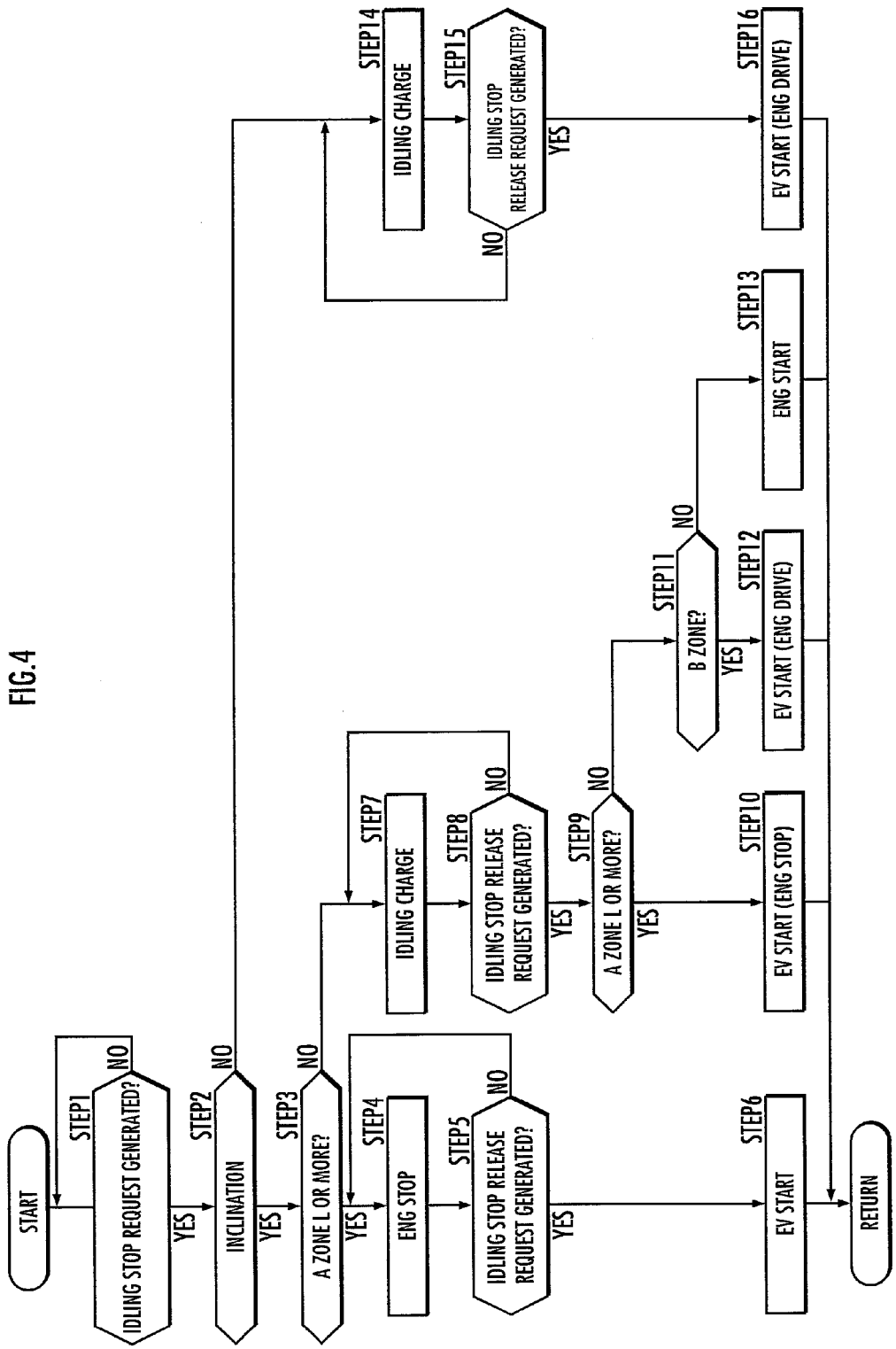
FIG. 4 A flow chart showing an idling stop control.

Next, an idling stop control of the hybrid vehicle will be explained with reference to FIG. 4. The following process is executed by the power control device ECU which corresponds to the idling stop control element of the present invention.

When an idling stop request is generated (STEP 1: YES), then it is determined whether or not the inclination D detected by the inclination sensor 11 is equal to or smaller than an inclination Db (STEP 2). It is determined that the idling stop request is generated, in the case where well-known predetermined conditions are all satisfied, such as the brake pedal sensor 12 detects the stepping of the brake pedal, the vehicle speed measured by the vehicle speed sensor 13 is 0 (the vehicle is stopped), and the like.

In the case where it is determined that the inclination D detected by the inclination sensor 11 is equal to or smaller than the inclination Db (STEP 2: YES), then it is determined whether or not the distinguished zone is equal to or larger than the A zone L (STEP 3).

In the case it is determined that the distinguished zone is equal to or larger than the A zone L (STEP 3: YES), then in the case where the internal combustion engine ENG is driving, the same is stopped (STEP 4). During stopping of the vehicle, the brake mechanism B is in the vehicle braking state, and the first clutch C1 is in the opened state.

Thereafter, when an idling stop release request is generated (STEP 5: YES), the vehicle is started by EV travel (STEP 6). Specifically, the vehicle braking state of the brake mechanism B is released, a brake B1 is set to a reverse inhibited state and the ring gear Ra of the planetary gear mechanism PG is set to the fixed state, the first clutch C1 is engaged to the transmission state and the 1st speed stage is established, and the electric motor MG is started.

It is determined that the idling stop release request is generated, in the case where the brake pedal sensor 12 detects that the brake pedal is not stepped, the accelerator pedal sensor 14 detects the opening degree of the accelerator pedal exceeding a predetermined value, and the like.

On the other hand, in the case where the distinguished zone is below the A zone L (STEP 3: NO), an idling charging is performed, in the case where the internal combustion engine ENG is driving, by continuing driving (STEP 7). During stopping of the vehicle, the brake mechanism B is in the vehicle braking state, the first clutch C1 is in the transmission state, and the first meshing mechanism SM1 is in the neutral state.

Thereafter, when the idling stop release request is generated (STEP 8: YES), then it is determined whether or not the distinguished zone is equal to or larger than the A zone L (STEP 9). In the case it is determined that the distinguished zone is equal to or larger than the A zone L (STEP 9: YES), then the driving of the internal combustion engine ENG is stopped, and thereafter the vehicle is started by EV travel (STEP 10).

Figure 5:
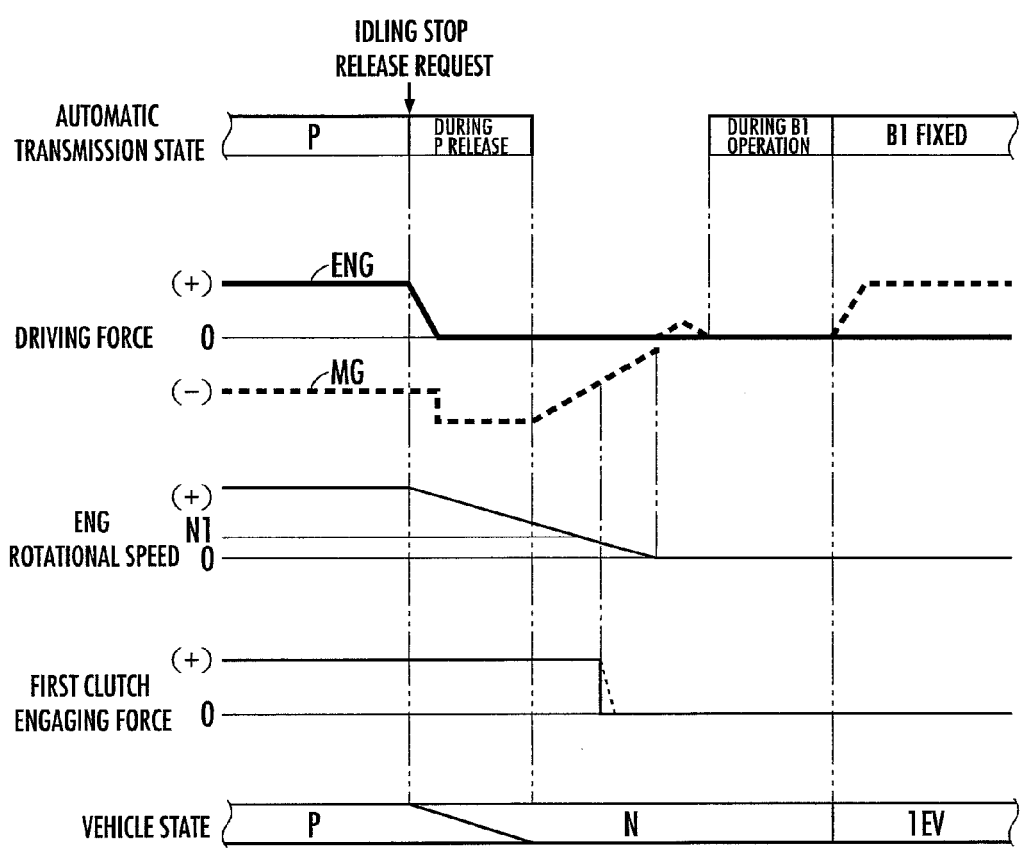
FIG. 5 A time chart showing the idling stop control, in the case of equal to or more than an A zone L when an idling stop release request is generated.

Specifically, as is shown in FIG. 5, when the idling stop release request is generated, the driving of the internal combustion engine ENG is stopped and as well the vehicle braking state by the brake mechanism B is released, the driving force of the electric motor MG in the negative direction is once increased so as to brake the rotation of the first input shaft 4 in the reverse direction, and decreases the rotational speed of the engine output shaft 2. Thereafter, when the rotational speed of the engine output shaft 2 becomes equal to or less than a predetermined low rotational speed N1, the first clutch C1 is set to the opened state. Thereafter, a rotational speed matching of the rotor MGb of the electric motor MG is performed so that the rotational speed of the ring gear Ra becomes 0, and while maintaining the state where the driving force of the electric motor MG to 0, the 1st speed stage is established by setting the brake B1 to the reverse inhibited state and setting the ring gear Ra of the planetary gear mechanism PG to the fixed state, and then the driving force of the electric motor MG is increased.

In the case where the distinguished zone is determined to be equal to or larger than the A zone L before the idling stop release request is generated, the driving of the internal combustion engine ENG may be stopped and the first clutch C1 may be set to the opened state at that time. In this case, however, the first clutch C1 is once engaged to the transmission state, when the idling stop release request is generated.

On the other hand, in the case where it is determined that the distinguished zone is below the A zone L (STEP 9: NO), then it is determined whether or not the distinguished zone is the B zone (STEP 11). In the case where it is determined that the distinguished zone is the B zone (STEP 11: YES), then the vehicle is started by the EV travel while continuing the driving of the internal combustion engine ENG (STEP 12). During the stopping of the vehicle, the brake mechanism B is in the vehicle braking state, the first clutch C1 is in the transmission state, and the first meshing mechanism SM1 is in the neutral state.

Figure 6:
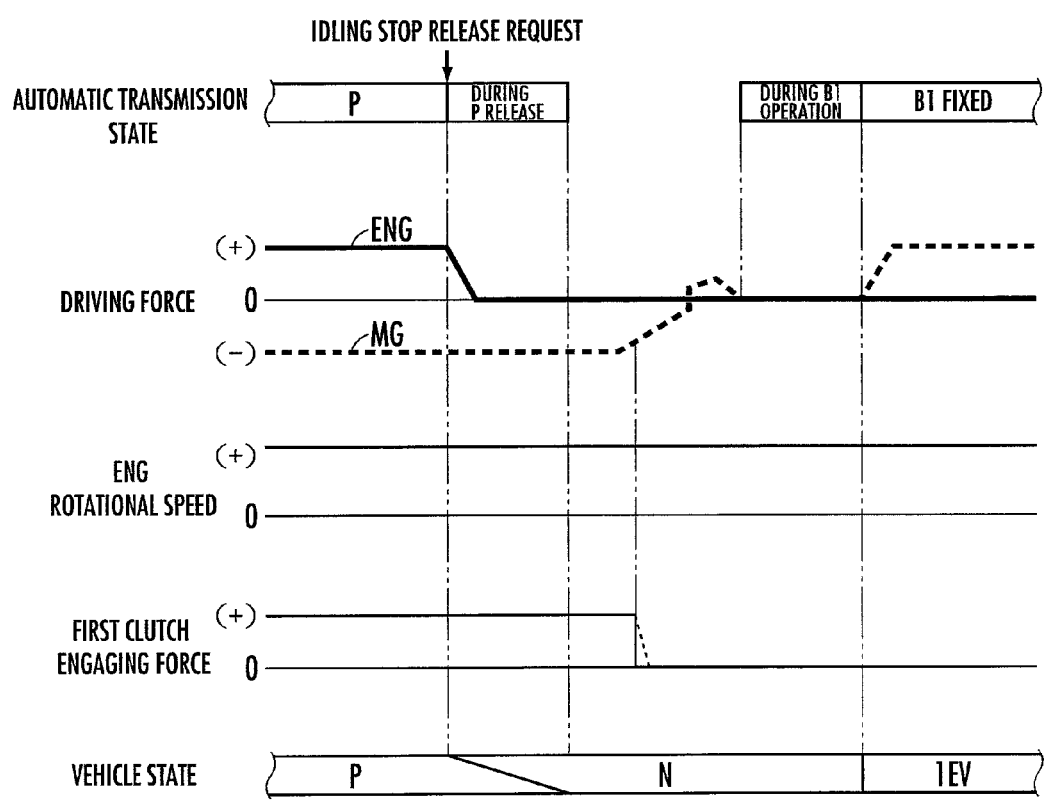
FIG. 6 A time chart showing the idle stop control, in the case of a B zone when the idling stop release request is generated.

Specifically, as is shown in FIG. 6, when the idling stop release request is generated, the vehicle braking state by the brake mechanism B is released as well as the first clutch C1 is set to the opened state. Thereafter, a rotational speed matching of the rotor MGb of the electric motor MG is performed so that the rotational speed of the ring gear Ra becomes 0, and while maintaining the state where the driving force of the electric motor MG is 0, the 1st speed stage is established by setting the brake B1 to the reverse inhibited state and setting the ring gear Ra of the planetary gear mechanism PG to the fixed state, and then the driving force of the electric motor MG is increased.

On the other hand, in the case where it is determined that the distinguished zone is not the B zone, that is, it is the C zone (STEP 11: NO), then the vehicle is started by the driving force of the internal combustion engine ENG (STEP 13).

Specifically, when the idling stop release request is generated, the vehicle braking state by the brake mechanism B is released, the brake B1 is set to a reverse inhibited state and the ring gear Ra of the planetary gear mechanism PG is set to the fixed state so as to establish the 1st speed stage, and thereafter the first clutch C1 is gradually engaged to the transmission state.

Further, in the case where it is determined that the inclination D detected by the inclination sensor 11 exceeds the inclination Db (STEP 2: NO), then the idling charging is performed, in the case where the internal combustion engine ENG is driving, by continuing driving (STEP 14). During stopping of the vehicle, the brake mechanism B is in the vehicle braking state, the first clutch C1 is in the transmission state, and the first meshing mechanism SM1 is in the neutral state. However, in the case where the distinguished zone is equal to or larger than the A zone H, the idling charging is not performed.

Thereafter, when the idling stop release request is generated (STEP 15; YES), as is with STEP 12, the vehicle is started by EV travel, while continuing driving of the internal combustion engine ENG (STEP 16).

As is explained above, the power control device ECU performs appropriate idling stop control, according to the zone distinguished by the zone distinguishing element 21 on the basis of the remaining capacity SOC of the electric storage device BATT, it becomes possible to reliably start the vehicle.

That is, in the case of the B zone or the C zone in which the remaining capacity SOC of the electric storage device BATT is small (STEP 3: NO), then when the idling stop request is generated (STEP 1: YES), the driving of the internal combustion engine ENG is not stopped (STEP 7). Thereafter, when the idling stop release request is generated (STEP 8: YES), in the case of the C zone (STEP 11: NO), the internal combustion engine ENG continues to drive, and the vehicle is started by engaging the first clutch C1 to a connected state (STEP 13).

Therefore, even in the C zone in which it is not possible to start up the internal combustion engine ENG by the driving force of the electric motor MG from the electric power of the electric storage device BATT, it becomes possible to start the vehicle by the driving force of the internal combustion engine ENG.

Further, when the idling stop release request is generated (STEP 8: YES), in the case of the B zone (STEP 11: YES), the internal combustion engine ENG continues to drive, and the vehicle is started by driving the electric motor MG while maintaining the first clutch C1 to an interrupted state (STEP 12).

Therefore, after the vehicle is started, in the case where the remaining capacity SOC of the electric storage device BATT decreased to become the C zone, it becomes possible to immediately travel the vehicle by the driving force of the internal combustion engine ENG, by engaging the first clutch C1 to the connected state.

Further, when the idling stop request is generated (STEP 1: YES), even in the B zone or the C zone where the remaining capacity SOC of the electric storage device BATT is small (STEP 3: NO), in the case where the remaining SOC of the electric storage device BATT increased from the idling charging thereafter (STEP 7) to become the A zone L or larger (STEP 9: YES), the vehicle is started by setting the internal combustion engine ENG to the stopped state, and the electric motor MG to the driving state (STEP 10). Therefore, it becomes possible to start the vehicle without accompanying fuel consumption by the internal combustion engine ENG.

Further, when the idling stop request is generated (STEP 1: YES), in the case of the B zone or the C zone in which the remaining capacity SOC of the electric storage device BATT is small, the idling charging of charging the electric storage device BATT is performed by the internal combustion engine ENG continuing to drive, the first clutch C1 being set to the connected state, and the first input shaft 4 rotating (STEP 7). Therefore, it becomes possible to increase the remaining capacity SOC of the electric storage device BATT during stopping of the vehicle.

Further, when the idling stop request is generated (STEP 1: YES), in the case where the vehicle is stopping while contacting a steep inclined road surface exceeding the threshold value Db (STEP 2: NO), the driving of the internal combustion engine ENG is continued regardless of the zone distinguished by the zone distinguishing element 21.

Thereafter, when the idling stop release request is generated (STEP 15: YES), the vehicle is started by the driving of the electric motor MG while continuing the driving of the internal combustion engine ENG and maintaining the first clutch C1 to the interrupted state, regardless of the zone distinguished by the zone distinguishing element 21 (STEP 16).

Therefore, after the vehicle is started, even in the case where the necessary driving force for climbing the steep inclined road cannot be supplied only from the electric motor MG, it becomes possible to immediately travel the vehicle by adding the driving force of the internal combustion engine ENG, by setting the first clutch C1 to the connected state.

Figure 7:
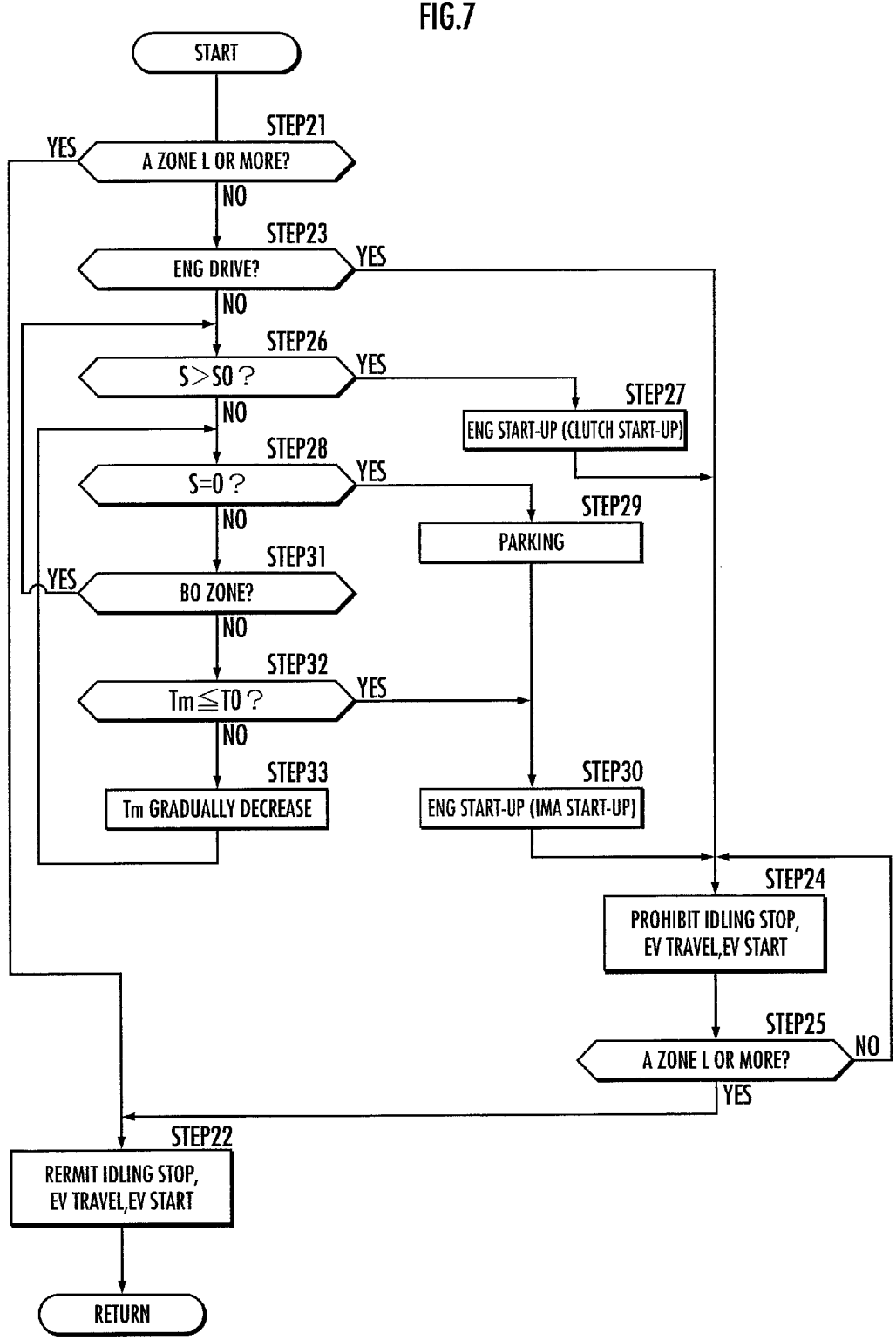
FIG. 7 A flow chart showing a start up control of an internal combustion engine during EV travel.

Next, the control during EV travel of the hybrid vehicle will be explained with reference to FIG. 7. The following process is executed by the power control device ECU corresponding to the control element of the present invention.

First, it is determined whether or not the zone distinguished by the zone distinguishing element 21 is equal to or larger than the A zone L (STEP 21). In the case where the distinguished zone in determined to be equal to or larger than the A zone L (STEP 21: YES), the travel of the vehicle continues in the state where the idling stop, the EV travel, and an EV starting is permitted (STEP 22).

On the other hand, in the case where it is determined that the distinguished zone is below the A zone L, that is, it is the B zone or the C zone (STEP 21: NO), then it is determined whether or not the internal combustion engine ENG is driving (STEP 23).

In the case where the internal combustion engine ENG is driving (STEP 23: YES), the travel of the vehicle is continued in the state where the idling stop, the EV travel, and the EV starting is prohibited (STEP 24), until the zone becomes equal to or larger than the A zone L (STEP 25: YES).

On the other hand, in the case where it is determined that the internal combustion engine ENG is not driving (STEP 23: NO), then it is determined whether or not a vehicle speed S detected by the vehicle speed sensor 13 exceeds a predetermined threshold value S0 (STEP 26). The predetermined threshold value S0 is a vehicle speed capable of starting the internal combustion engine ENG, and for example is 10 km per hour.

In the case where the vehicle speed S exceeds the predetermined threshold value S0 (STEP 26: YES), then the internal combustion engine ENG is started up by a clutch start-up (STEP 27).

Figure 8:
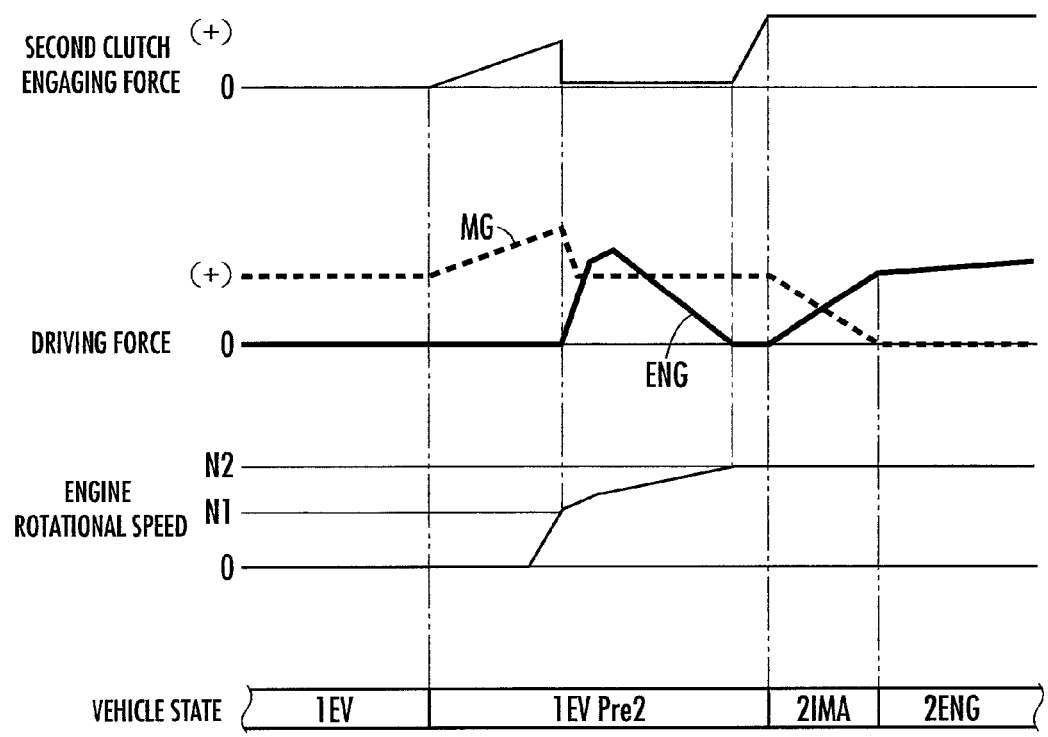
FIG. 8 A time chart showing the start up control of the internal combustion engine by clutch start-up.

Specifically, as is shown in FIG. 8, for example in the case where the vehicle is performing EV travel at the 2nd-speed stage fixed state, first the second meshing mechanism SM2 is set to the 2nd-speed side coupled state and the automatic transmission 1 to a 2nd-speed pre-shift state, and then the second clutch C2 is gradually engaged. At this time, the driving power transmitted to the output shaft 3a decreases from the friction of the second clutch C2, so that a driving force Tm of the electric motor MG is increased so as to compensate the decrease.

Thereafter, when the rotational speed of the engine output shaft 2 reaches a start-up rotational speed N1 which is the rotational speed capable of starting up the internal combustion engine ENG, the internal combustion engine ENG is started up by igniting a spark plug (not shown). Thereafter, when the rotational speed of the engine output shaft 2 reaches a target rotational speed N2, the second clutch C2 is engaged to the transmission state. At this time, the driving force Tm of the electric motor MG is decreased in line with the increase in a driving force Te of the internal combustion engine ENG, and finally the vehicle is made to travel only by the driving force Te of the internal combustion engine ENG.

Thereafter, the travel only by the driving force Te of the internal combustion engine ENG is continued in the state where the idling stop, the EV travel, and the EV starting is prohibited (STEP 24), until the zone becomes equal to or larger than the A zone L (STEP 25: YES).

On the other hand, in the case where the vehicle speed S is equal to or smaller than the predetermined threshold value S0 (STEP 26: NO), it is determined whether or not the vehicle speed S detected by the vehicle speed sensor 13 is 0 (STEP 28).

In the case where the vehicle speed S is 0, that is when vehicle is stopped (STEP 28: YES), the brake mechanism B is set to the vehicle braking state, so as to reliably maintain the stopped stated of the vehicle (STEP 29). By doing so, the vehicle does not slid down the road surface, even when the road surface on which the vehicle stopped has steep inclination.

From the vehicle stopped state, the internal combustion engine ENG is started up by normal IMA start-up (STEP 30). Thereafter, the traveling of the vehicle is continued in the state where the idling stop, the EV travel, and the EV starting is prohibited (STEP 24), until the zone becomes equal to or more than the A zone L (STEP 25: YES).

On the other hand, in the case where the vehicle speed S is not 0, that is, in the case where the vehicle is traveling (STEP 28; NO), then it is determined whether or not the zone is the B zone (STEP 31).

In the case where the zone is the B zone (STEP 31: YES), the case where the internal combustion engine ENG is incapable of being started up by driving the electric motor MG with the electric power from the electric storage device BATT does not occur rapidly. Therefore, the process returns to STEP 26, continues the EV travel, and waits for a chance where the vehicle speed S exceeds the predetermined threshold value S0 (STEP 26: YES), or the vehicle speed S becomes 0 (STEP 28: YES).

On the other hand, in the case where the zone is not the B zone, that is, it is the C zone (STEP 31: NO), the case where the internal combustion engine ENG is incapable of being started up by driving the electric motor MG with the electric power from the electric storage device BATT occurs rapidly.

Therefore, it is determined whether or not the driving force Tm generated by the electric motor MG is equal to or smaller than a driving force T0 which is capable of releasing the coupled state of the first meshing mechanism SM1 (STEP 32), and in the case where the driving force Tm generated by the electric motor MG exceeds the driving force T0 (STEP 32:

NO), then the driving force Tm generated by the electric motor MG is gradually decreased (STEP 33). When gradually decreasing the driving force Tm of the electric motor MG the shock becomes larger as the vehicle speed S becomes faster. Therefore, it is preferable that, as the vehicle speed S detected by the vehicle speed sensor 13 is faster, the decreasing speed of the driving force Tm of the electric motor MG becomes smaller.

Thereafter, when the driving force Tm generated by the electric motor MG becomes equal to or smaller than the driving force T0 (STEP 32: YES), the internal combustion engine ENG is started up by the IMA start-up explained below (STEP 30).

As is shown in FIG. 9(a), for example in the case where the vehicle is performing the EV travel at the 3rd-speed stage fixed state, first the 3rd-speed side coupled state of the first meshing mechanism SM1 is released to the neutral state. At this time, as is shown in FIG. 9(b), the vehicle speed S is an extreme low speed of below the predetermined threshold value S0, and the rotational speed of the carrier Ca coupled to the output shaft 3a drops from the travel resistance, whereas the rotational speed of the sun gear Sa fixed to the first input shaft 4 disconnected from the output shaft 3a increases, so that the ring gear Ra rotates in reverse.

Then, when the rotational speed of the first input shaft 4 exceeds the start-up rotational speed N1, the first clutch C1 is engaged, and in the state where the rotational speed of the engine output shaft 2 exceeds the start-up rotational speed N1, the spark plug (not shown) is ignited so as to start up the internal combustion engine ENG.

Thereafter, once the first clutch C1 is set to the opened state, as is shown in FIG. 9(c), while performing the rotational speed matching of the rotor MGb of the electric motor MG so that the rotational speed of the ring gear Ra becomes 0, the ring gear Ra of the planetary gear mechanism PG is set to the fixed state by the lock mechanism R1 so as to establish the 1st speed stage, and then the first clutch C1 is engaged to perform the HEV travel at 1st speed stage. Thereafter, the operation of the electric motor MG is stopped, and the vehicle is made to travel only by the driving force of the internal combustion engine ENG.

Thereafter, until the zone becomes equal to or larger than the A zone L (STEP 25: YES), the travel of the vehicle is continued in the state where the idling stop, the EV travel, and the EV starting is prohibited (STEP 24).

As is explained above, in the case where the vehicle speed S becomes equal to or lower than the threshold value S0 and the zone became equal to or lower the C zone during EV travel, the driving force Tm of the electric motor MG is gradually decreased until it becomes the driving force T0 capable of releasing the coupled state of the first meshing mechanism SM1, and then the internal combustion engine ENG is started up by releasing the coupled state of the first meshing mechanism SM1 and setting the first clutch C1 to the connected state.

Therefore, it becomes possible to start up the internal combustion engine ENG reliably, before the remaining capacity SOC of the electric storage device BATT drops below the value in which it becomes impossible to start up the internal combustion engine ENG by driving the electric motor MG with the electric power from the electric storage device BATT.

At this time, the internal combustion engine is started up by releasing the coupled state of the first meshing mechanism SM1 and then by setting the first clutch C1 to the connected state. Therefore, the driving force (draw-in torque) by the start-up of the internal combustion engine ENG is not transmitted to the output member 3. Further, the electric motor MG may be used only for the starting up of the internal combustion engine ENG, it becomes possible to start up the internal combustion engine ENG surely.

Thereafter, in the case where the zone became the B zone adjacent to the C zone, when the vehicle speed S exceeds the predetermined threshold value S0, or the vehicle speed S became 0 and the vehicle stopped, the internal combustion engine ENG is started up by driving the electric motor MG with the electric power from the electric storage device BATT. Therefore, it becomes possible to prevent the remaining capacity SOC of the electric storage device BATT from dropping, by starting up the internal combustion engine ENG, before the EV travel is continued and the remaining capacity SOC of the electric storage device BATT drops to the C zone.

In the present embodiment, explanation is given to the case where the internal combustion engine ENG is started up by engaging the first clutch C1 to the transmission state. However, the internal combustion engine ENG may be started up by engaging the second clutch C2 to the transmission state.

Figure 10:
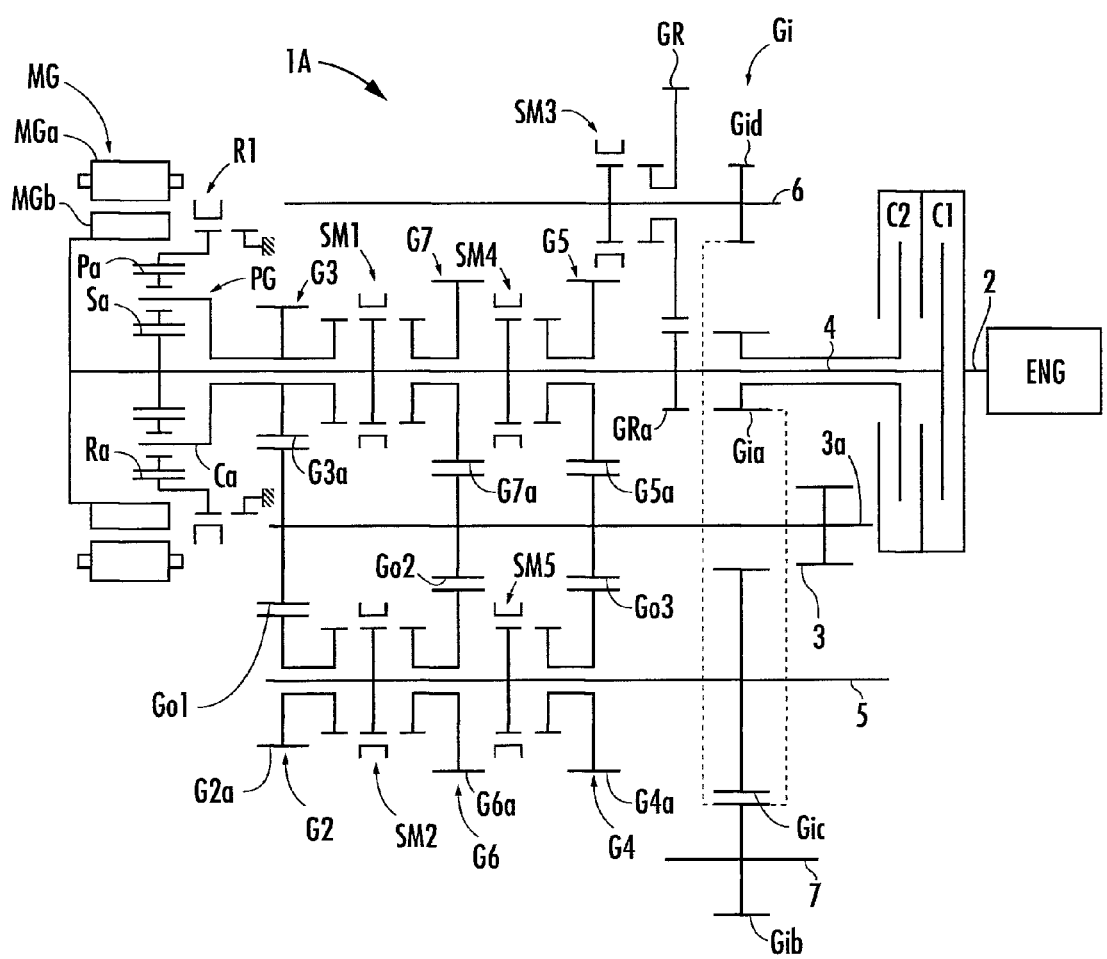
FIG. 10 An explanatory view showing another automatic transmission that the hybrid vehicle according to the embodiment of the present invention equips.

Further, the automatic transmission provided to the hybrid vehicle of the present invention is not limited to the automatic transmission 1 having five forward speed stages and one rearward speed stage explained above, and may be, for example, an automatic transmission 1A having seven forward speed stages and one rearward speed stage, as is shown in FIG. 10.

The automatic transmission 1A is equipped with a plurality of gear trains G2 to G7 of different transmission gear ratios, the drive gears G3a, G5a, and G7a of the odd gear trains G3, G5 and G7 are rotatably supported by the first input shaft 4, and the drive gears G2a, G4, and G6a of the even gear trains G2, G4, and G6 are rotatably supported by the second input shaft 5.

To the output shaft 3a, the first driven gear Go1 meshing with the 2nd-speed drive gear G2a and the 3rd-speed drive gear G3a, the second driven gear Go2 meshing with a 6th-speed drive gear G6a and a 7th-speed drive gear G7a, and a third driven gear Go3 meshing with the 4th-speed drive gear G4a and the 5th-speed drive gear G5a, are fixed.

The first input shaft 4 is provided with the first meshing mechanism SM1, which is the first selecting element capable of switching to either of the 3rd-speed side coupled state in which the 3rd-speed drive gear G3a and the first input shaft 4 are coupled, a 7th-speed side coupled state in which the 7th-speed drive gear G7a and the first input shaft 4 are coupled, and the neutral state in which the coupling of the 3rd-speed drive gear G3a and the 7th-speed drive gear G7a to the first input shaft 4 is cut off.

The first input shaft 4 is further provided with a fourth meshing mechanism SM4 which is the first selecting element capable of switching to either of the 5th-speed side coupled state in which the 5th-speed drive gear G5a and the first input shaft 4 are coupled, and the neutral state in which the coupling of the 5th-speed drive gear G5a to the first input shaft 4 is cut off.

The second input shaft 5 is provided with the second meshing mechanism SM2, which is the second selecting element capable of switching to either of the 2nd-speed side coupled state in which the 2nd-speed drive gear G2a and the second input shaft 5 are coupled, a 6th-speed side coupled state in which the 6th-speed drive gear G6a and the second input shaft 5 are coupled, and the neutral state in which the coupling of the 2nd-speed drive gear G2a and the 6th-speed drive gear G6a to the second input shaft 5 are cut off.

The second input shaft 5 is further provided with a fifth meshing mechanism SM5 which is the second selecting element capable of switching to the 4th-speed side coupled state in which the 4th-speed drive gear G4a and the second input shaft 5 are coupled, and the neutral state in which the coupling of the 4th-speed drive gear G4a to the second input shaft 5 are cut off.

The hybrid vehicle equipped with the automatic transmission 1A configured as explained above is capable of performing the IMA starting, and the ENG travel, the HEV travel and the EV travel in the state where the seven forward speed stages and the rear speed stage are respectively established, and the idling stop control and the control during the EV travel is executed by the power control device ECU.

The invention claimed is:

1. A hybrid vehicle, comprising:
an internal combustion engine;
an electric motor;
an electric storage device providing and receiving electric power to and from the electric motor;
an automatic transmission including a first input shaft, a second input shaft, and a coupling element which couples the first input shaft or the second input shaft selectively to an output shaft, wherein a driving force of the internal combustion engine is selectively transmitted to the first input shaft via a first clutch, the first input shaft is connected to the electric motor, the driving force of the internal combustion engine is selectively transmitted to the second input shaft via a second clutch, and a motive power output from the internal combustion engine and the electric motor is shifted and transmitted to the output shaft;
a zone distinguishing element detecting a remaining capacity of the electric storage device, and distinguishes, on the basis of the detected remaining capacity, a standard zone, a discharge limited zone in which the remaining capacity is smaller than the standard zone, and a discharge prohibited zone in which the remaining capacity is smaller than the discharge limited zone; and
an idling stop control element controlling charging of the electric storage device, wherein when an idling stop request is generated and the zone distinguished by the zone distinguishing element is the discharge limited zone or the discharge prohibited zone, the idling stop control element sets the first clutch to a connected state while maintaining driving of the internal combustion engine so as to rotate the first input shaft, and thereafter, when an idling stop release request is generated and the zone distinguished by the zone distinguishing element is the standard zone, the idling stop control element controls to start the vehicle while setting the internal combustion engine to a stopped state and the electric motor to a driving state, when an idling stop release request is generated and the zone distinguished by the zone distinguishing element is the discharge limited zone, the idling stop control element controls to start the vehicle by driving the electric motor while continuing driving of the internal combustion engine and maintaining the first clutch in an interrupted state, and when an idling stop release request is generated and the zone distinguished by the zone distinguishing element is the discharge prohibited zone, the idling stop control element control to start the vehicle by continuing driving of the internal combustion engine and setting the first clutch to the connected state.

2. The hybrid vehicle according to claim 1,
wherein the coupling element includes a first selecting element which selectively couples the first input shaft and the output shaft, a second selecting element which selectively couples the second input shaft and the output shaft, and a differential rotating mechanism which is configured from a first rotating element which is connected to the first input shaft, a second rotating element which is coupled to the output shaft, and a third rotating element provided with a lock element, so as to be able to mutually rotate differentially, and
the idling stop control element controls charging of the electric storage device, wherein when the idling stop request is generated and the zone distinguished by the zone distinguishing element is the discharge limited zone or the discharge prohibited zone, the idling stop control element sets the first clutch to the connected state while maintaining driving of the internal combustion engine, and rotating the first input shaft by setting the third rotating element to a lock released state by the lock element, and thereafter, when the idling stop release request is generated, the idling stop control element controls so as to start the vehicle after setting the third rotating element to a locked state by the lock element.

3. The hybrid vehicle according to claim 1,
further comprising an inclination detecting element which detects an inclination of a road surface to which the vehicle contacts,
wherein the coupling element includes a first selecting element which selectively couples the first input shaft and the output shaft, a second selecting element which selectively couples the second input shaft and the output shaft, and a differential rotating mechanism which is configured from a first rotating element which is connected to the first input shaft, a second rotating element which is coupled to the output shaft, and a third rotating element provided with a lock element, so as to be able to mutually rotate differentially, and
the idling stop control element controls charging of the electric storage device, wherein when the idling stop request is generated and the inclination detected by the inclination detecting element exceeds a threshold value, the idling stop control element sets the first clutch to the connected state while continuing driving of the internal combustion engine, and by rotating the first input shaft, and thereafter, when the idling stop release request is generated, the idling stop control element controls to make the vehicle start by driving the electric motor, while continuing driving of the internal combustion engine, and while maintaining the first clutch to the interrupted state.

* * * * *